United States Patent [19]
Imai et al.

[11] 3,867,458
[45] Feb. 18, 1975

[54] PROCESS FOR PREPARING 2-ALKOXY-5-METHOXYBENZALDEHYDE

[75] Inventors: Shinichi Imai; Kazuya Sano, both of Kanagawa, Japan

[73] Assignee: Fuji Photo Film Co., Ltd., Kanagawa, Japan

[22] Filed: Mar. 13, 1972

[21] Appl. No.: 234,374

[30] Foreign Application Priority Data
Mar. 12, 1971 Japan.............................. 46-13362

[52] U.S. Cl. ............................................. 260/600
[51] Int. Cl............................................. C07c 45/00
[58] Field of Search .................................... 260/600

[56] References Cited
OTHER PUBLICATIONS
Tiemann et al., Berichte, Vol. 14, (1881) 1992–1993.
Musser et al., J.A.C.S. Vol. 60, (1938) 664–669.
Migrdichian, Org. Synthesis, Vol. (2), (1957) 1284.

*Primary Examiner*—Bernard Helfin
*Attorney, Agent, or Firm*—Sughrue, Rothwell, Mion, Zinn & Macpeak

[57] ABSTRACT

A process for preparing 2-alkoxy-5-methoxybenzaldehyde, said alkoxy group being a methoxy or an ethoxy group, which comprises reacting, in the presence of potassium carbonate, 2-hydroxy-5-methoxybenzaldehyde with a dialkyl sulfate, said alkyl group being a methyl or an ethyl group, is disclosed.

10 Claims, No Drawings

PROCESS FOR PREPARING 2-ALKOXY-5-METHOXYBENZALDEHYDE

BACKGROUND OF THE INVENTION

1. Field of the Invention

This invention relates to a process for preparing 2-alkoxy-5-methoxybenzaldehyde, particularly to a process for preparing 2-alkoxy-5-methoxybenzaldehyde by an alkylating a 2-hydroxy-5-methoxybenzaldehyde.

2. Description of the Prior Art

Hitherto, as a method of alkylating 2-hydroxy-5-methoxybenzaldehyde, only a methylating process was known. This method comprises boiling 2-hydroxy-5-methoxybenzaldehyde in methanol together with methyl iodide in the presence of sodium methoxide [see Berichte der deutschen chemischen gesellschaft, vol. 14, p. 1958–1999 (1881)]. No descriptions of ethylating and other alkylating methods are known. However, the above described method is economically very disadvantageous because the methyl iodide used as an alkylating agent is expensive and an excess amount of methyl iodide is necessary since it is lost from the reaction system due to its lower boiling point. The method also has the disadvantages that the recovery procedures after the reaction are troublesome and that the yield is low (about 40%).

SUMMARY OF THE INVENTION

Therefore, an object of this invention is to provide a process for preparing 2-alkoxy-5-methoxybenzaldehyde simply, economically and in high yields. Another object is to provide a novel 2-alkoxy-5-methoxybenzaldehyde.

These objects are attained by alkylating 2-hydroxy-5-methoxybenzaldehyde with dimethyl sulfate or diethyl sulfate or diethyl sulfate in the presence of potassium carbonate.

DETAILED DESCRIPTION OF THE INVENTION

As described above, this invention relates to a process for preparing 2,5-dimethoxybenzaldehyde or 2-ethoxy-5-methoxy-benzaldehyde by reacting 2-hydroxy-5-methoxybenzaldehyde with dimethyl sulfate or diethyl sulfate in the presence of potassium carbonate.

This invention utilizes dimethyl sulfate or diethyl sulfate in the presence of potassium carbonate, and it will become obvious that the combination of the dialkyl sulfate and the potassium carbonate is specific and the results obtained unexpected.

Namely, when methyl tosylate was used as methylating agent instead of dimethyl sulfate, the products did not successfully crystallize because of the presence of residual methyl tosylate. Furthermore, when the reaction was attempted with diethyl sulfate in the presence of sodium carbonate, the reaction did not proceed.

Dimethyl sulfate, diethyl sulfate and potassium carbonate used in this invention may be used as the commercially available materials. It is preferred for high yields that the amounts of potassium carbonate and dimethyl sulfate or diethyl sulfate be present in greater than equimolecular amounts to the 2-hydroxy-5-methoxybenzaldehyde. However the reaction will also proceed with amounts less than equimolar amounts. Since amounts in great excess do not give rise to any advantages and add to the cost of the process, generally it is sufficient to use less than 1.5 times the molecular amount. With respect to the reaction temperatures which can be employed, too low a temperature results in a slow reaction rate and, on the other hand, too high a temperature results in too rapid of a reaction rate. For instance when the reaction is carried out at 120° C without a solvent using potassium carbonate and dimethyl sulfate, the reaction mixture resinifies before the completion of the reaction and colors. Therefore, generally, the reaction both in the presence or absence of a solvent is preferably carried out at a temperature between room temperature and 100° C. Generally, when a solvent is used, the reaction is carried out near the boiling point of the solvent.

While reaction solvents are not necessary for the process of this invention, suitable solvents may be employed if desired. If solvents are used it is necessary to select solvents which per se are not alkylated, i.e., those which are inert to the alkylation effects of the dialkyl sulfate. Suitable such non-alkylatable solvents are diethyl ether, dioxane, acetone methyl ethyl ketone, ethyl acetate, butyl acetate, tetrahydrofuran, and the like. When the desired compound is recovered by pouring the reaction mixture into water after the completion of the reaction, solvents such as dioxane, acetone and methyl ethyl ketone miscible with water are preferably used. For instance, acetone is preferred. Agitation causes the reaction to proceed rapidly. The reaction time can be varied over a wide range depending upon conditions such as reaction temperature and agitation. For example, the reaction time can vary from several tens of minutes to several days. When the reaction is completed, which can be determined by gas chromatographic analysis, for example, the reaction mixture is poured into water and the desired compound is obtained by recovering the precipitated crystals. The compound obtained by such treatments is pure enough that further recrystallization is unnecessary. According to this invention a high yield of near 100 percent is attained with the selection of suitable conditions. Further, 2-ethoxy-5-methoxybenzaldehyde is a compound not described in the prior art.

As described above, with the process of this invention the disadvantages present in the known process such as high cost, difficulties with recovery procedures and low yield are completely solved.

The following examples are given to illustrate this invention in greater detail.

EXAMPLE 1

50 g of 2-hydroxy-5-methoxybenzaldehyde, 68 g of potassium carbonate and 50 g of dimethyl sulfate were refluxed in 250 ml of acetone for about 3 hours under stirring. After the reaction, the reaction mixture was filtered and the acetone was distilled off from the filtrate and then the residue was poured into 300 ml of water. The precipitated crystals were collected by filtration and dried whereby 45 g of 2,5-dimethoxybenzaldehyde having a melting point of 48° C were obtained (yield 82.5%).

EXAMPLE 2

On standing the mixture of 2-hydroxy-5-methoxybenzaldehyde, potassium carbonate and dimethyl sulfate as in Example 1 at room temperatures the reaction was completed in 7 days. This was confirmed by gas chromatography. By treating the reaction mixture as described in Example 1, 44.5 g of 2,5-dimethoxybenzaldehyde having a melting point of 47° C were obtained (yield 81.5%).

EXAMPLE 3

15.2 g of 2-hydroxy-5-methoxybenzaldehyde, 16.6 g of potassium carbonate and 13.9 g of dimethylsulfate were heated at 100° C with stirring. After 30 minutes the reaction was completed and the reaction mixture was poured into 100 ml of water. The precipitated crystals were collected by filtration and dried whereby 11.5 g of 2,5-dimethoxybenzaldehyde having a melting point of 47.5° C were obtained (yield 69.5%).

EXAMPLE 4

By repeating the procedures described in Example 1 except that 61 g of diethyl sulfate were used instead of 50 g of dimethyl sulfate, 53 g of 2-ethoxy-5-methoxybenzaldehyde having a melting point of 47° – 48° C were obtained (yield 97.5%). Anal. Found: C, 66.58; H, 6.74. Calcd.: C, 66.67; H, 6.67.

The compounds of this invention are useful as intermediates in the preparation of dyestuffs.

What is claimed is:

1. A process for preparing 2-alkoxy-5-methoxybenzaldehyde, said alkoxy group being a methoxy or an ethoxy group, which comprises reacting, in the presence of potassium carbonate, 2-hydroxy-5-methoxybenzaldehyde with a dialkyl sulfate, said alkyl group being a methyl or an ethyl group.

2. A process according to claim 1, wherein the potassium carbonate and the dialkyl sulfate are present in greater than equimolecular amounts to the 2-hydroxy-5-methoxybenzaldehyde.

3. A process according to claim 1, wherein the potassium carbonate and the dialkyl sulfate are each present in a molar ratio of from 1 to 1.5 times the molar amount of 2-hydroxy-5-methoxybenzaldehyde.

4. A process according to claim 1, wherein the reaction temperature is below 100° C.

5. A process according to claim 1, wherein the reaction temperature is between room temperature and 100° C.

6. A process according to claim 1, wherein said reaction is conducted in a solvent, said solvent being inert to said dialkyl sulfate.

7. A process according to claim 6, wherein said solvent is miscible with water.

8. A process according to claim 7, wherein said solvent is acetone.

9. A process for preparing 2,5-dimethoxybenzaldehyde which comprises reacting 2-hydroxy-5-methoxybenzaldehyde with from 1 to 1.5 moles of dimethyl sulfate per mole of 2-hydroxy-5-methoxybenzaldehyde in the presence of from 1 to 1.5 moles of potassium carbonate per mole of 2-hydroxy-5-methoxybenzaldehyde at a temperature between room temperature and 100° C.

10. A process according to claim 9, wherein said reaction is in the presence of acetone as a solvent.

* * * * *